No. 637,541. Patented Nov. 21, 1899.
M. WILKES.
SWING AND EXPANSION JOINT.
(Application filed Oct. 2, 1899.)
(No Model.)

Witnesses

Inventor
Moses Wilkes
By
Attorney

UNITED STATES PATENT OFFICE.

MOSES WILKES, OF TRENTON, NEW JERSEY.

SWING AND EXPANSION JOINT.

SPECIFICATION forming part of Letters Patent No. 637,541, dated November 21, 1899.

Application filed October 2, 1899. Serial No. 732,345. (No model.)

*To all whom it may concern:*

Be it known that I, MOSES WILKES, a citizen of the United States, residing at Trenton, in the county of Mercer and State of New Jersey, have invented certain new and useful Improvements in Swing and Expansion Joints; and I do hereby declare the following to be a full, clear, and exact description of the invention, such as will enable others skilled in the art to which it appertains to make and use the same.

My invention relates to certain new and useful improvements in joints for making connection between supply-pipes from steam or other pipes containing an expansive agent and moving devices, such as presses, platens, &c.

My invention has for its object to dispense with the ordinary flexible connections, which experience has demonstrated to be unreliable and of short life, especially when subjected to high pressure, and to provide a single simple joint readily adaptable to connect with pipes leading in directions at an angle to each other and permitting of varying relations between the connections; and with these ends in view my invention consists in the novel swing and expansion joint, as hereinafter and in detail described.

In order that those skilled in the art to which my invention appertains may know how to make and use the same, I will proceed to describe its construction and operation, referring by letters to the accompanying drawings, in which—

Figure 1:
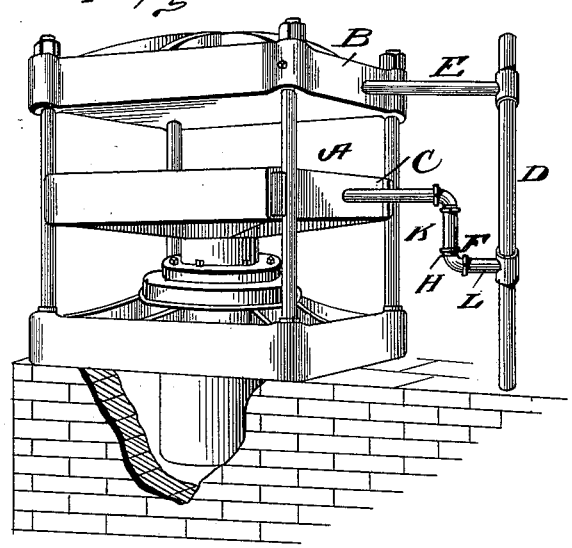
Figure 2:
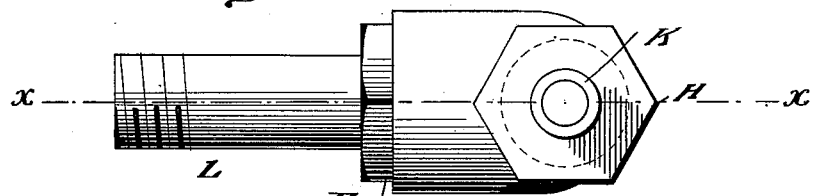
Figure 4:
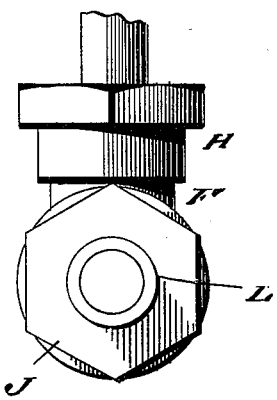
Figure 3:
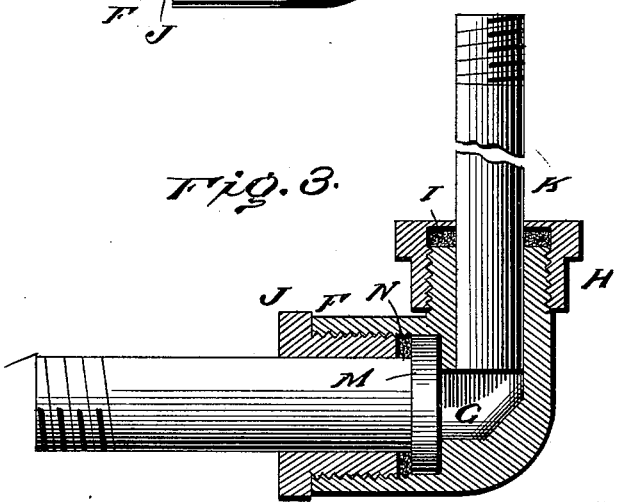

Figure 1 represents a perspective view of an ordinary press and steam-supply pipe connected by one of my improved swing and expansion joints. Fig. 2 is a plan view looking at the expansion end of the joint. Fig. 3 is a vertical section on the line $x$ $x$ of Fig. 2 and showing the expansion and swing connections in elevation, and Fig. 4 is a plan view looking at the swing end of the joint.

Similar letters of reference indicate like parts in the several views.

A represents a press of any desired construction.

B is the stationary platen or die, and C the movable one, both of which it may, for instance, be desirable to furnish with live steam for heating the same.

D is a stationary steam-supply pipe, from which a stiff connection E is made with the stationary platen B.

F is one of my improved joints made in the form of an elbow with central communicating-channels constituting a continuous steam-passage G. One arm of the elbow is exteriorly threaded to receive a nut H, correspondingly screw-threaded.

I is a suitable packing interposed between the end of the arm of the elbow, which is held in place and rendered effective by the adjustment of the screw-nut H. The other arm of the elbow is interiorly threaded to receive an exteriorly-threaded nut J.

A connecting-pipe K, threaded at one end to couple with a union on the steam-supply pipe extending from the movable platens C is introduced into the coupling through the packing I and is adapted to reciprocation therein, and L is another pipe threaded at one end for connection with any suitable union in the supply-pipe D and formed at its other end with an annular shoulder or head M. The shouldered end or head of the pipe L is adapted to pass freely within the threaded arm of the elbow and the proportion of the shoulder relative to the length of the exteriorly-threaded nut J, that a space N will be provided for any suitable packing.

From the construction shown it will be seen that as the movable platen rises and descends the joint F is free to slip upon the end of the pipe K, while at the same time the joint is free to rock or rotate upon the end of the connecting-pipe L between the platen and the supply-pipe D.

It will be understood that the limit of reciprocating movement between the pipe K and the arm of the joint in which it is located and packed may be regulated by the length of the pipe and the arm in an obvious manner and that there will be no limit of rotation between the pipe L and the joint, and that therefore a safe and durable connection may be readily made between a stationary supply-pipe and a movable platen or equivalent by a single joint readily applied.

While I have shown the joint K made with its arms at right angles, it will be understood that I do not wish to be confined in this particular, and that the arms may bear such relation to each other as may be necessary to apply the joint to connecting-pipes at varying angles to each other. I am aware that connections have been made between parts of machinery changing their relations to each other; but in all such connections with which I am familiar it has been necessary to use two connecting-joints, one of which may admit of a reciprocating movement of the parts and the other admitting of a rotary movement of the parts relatively to one another, and I therefore do not wish to have my invention confounded therewith; but

What I claim as new, and desire to secure by Letters Patent, is—

A compound swing and expansion joint composed of an elbow F, having a continuous passage G, and exteriorly threaded at one end and formed with a packing I, and interiorly threaded at the opposite end, in combination with an interiorly-threaded packing-nut H, and slip or expansion connection K, and a swing connection L, formed with a shoulder M and exteriorly-threaded nut J, substantially as and for the purpose set forth.

In testimony whereof I affix my signature in presence of two witnesses.

MOSES WILKES.

Witnesses:
PETER BACKES,
L. C. CASE, Jr.